Jan. 5, 1971  K. G. GRONINGER  3,552,187
DEVICE FOR MEASURING THE RELATIVE MOISTURE CONTENT OF GASES
Filed Feb. 15, 1968
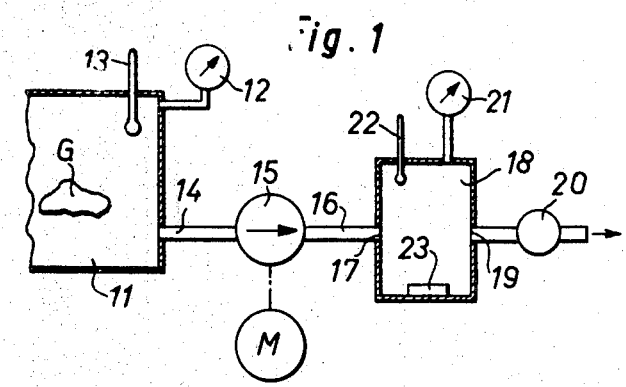
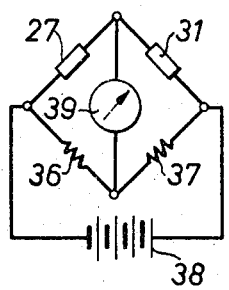
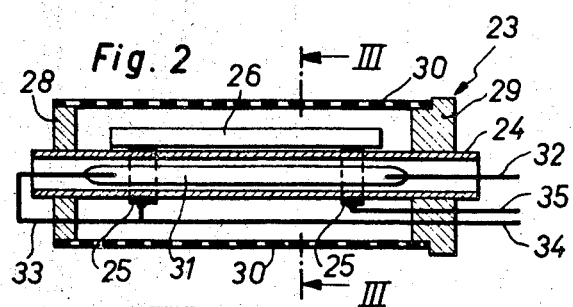
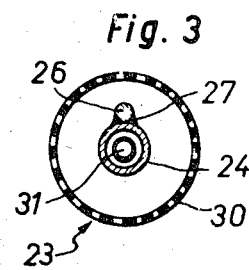
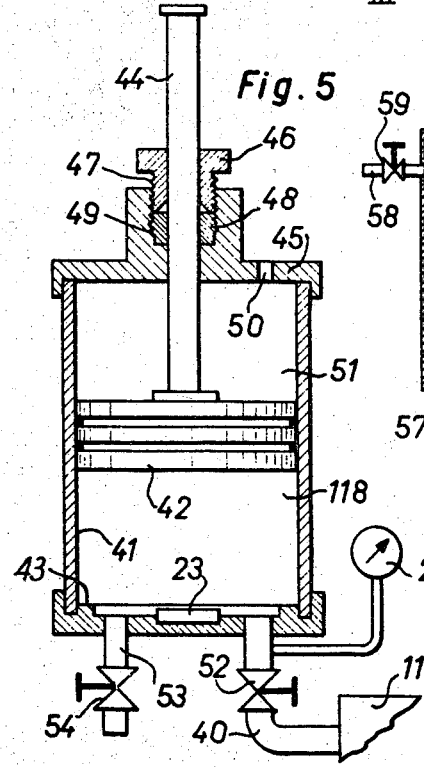
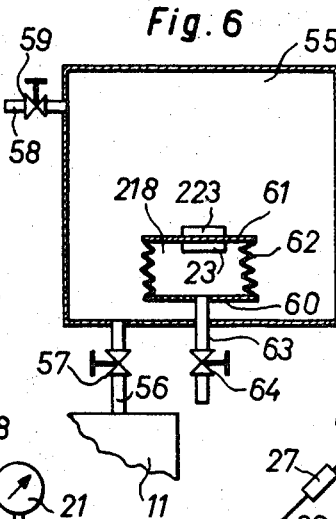
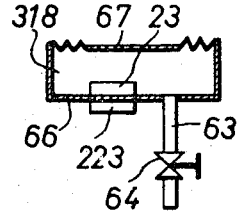
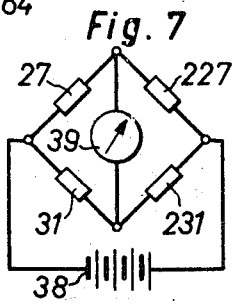
INVENTOR.
KURD G. GRONINGER
BY
Woodhams, Blanchard & Flynn
ATTORNEYS

United States Patent Office 3,552,187
Patented Jan. 5, 1971

3,552,187
DEVICE FOR MEASURING THE RELATIVE MOISTURE CONTENT OF GASES
Kurd G. Groninger, Wettingen, Switzerland, assignor to Sina AG, Zurich, Switzerland
Filed Feb. 15, 1968, Ser. No. 705,761
Int. Cl. G01n *25/56, 27/02*
U.S. Cl. 73—29                                8 Claims

ABSTRACT OF THE DISCLOSURE

An apparatus for measuring the moisture content of a gas sample, which apparatus includes a chamber for receiving the gas sample and means for compressing the gas sample supplied to the chamber for increasing the number of gas molecules per unit volume of the chamber. The chamber has a moisture measuring head located therein, which head has a hydroscopic electric resistor having a resistive valve which varies in dependence on the relative humidity within the chamber, the hydroscopic electric resistor being connected to an external electric measuring circuit.

---

The present invention relates to a device and a process for measuring the relative humidity of a gas under difficult conditions, for example, extremely low or extremely high humidities. The first case occurs for example in a vacuum dryer, when it is necessary to determine whether the remaining moisture in an article to be dried has reached the desired value, whereby it is determined from the assumption, well established in practice, that a state of equilibrium has been reached between the relative humidity of the articles and that of the surrounding gas, for example air. Then, as is well known, the dampness of the material is equated according to the definition with the relative humidity of the gas.

The measurement of extremely low and extremely high relative humidities in industrial processing techniques is therefore difficult because in industrial conditions the simplicity of the electrical probes renders them proportionally insensitive at both ends of the scale of moisture and because the electric bridge circuits usually used, to which the heads are connected, are affected by adverse working conditions in which the sensitivity of measurement and also the accuracy of measurement are considerably reduced.

The object of the invention is thus to provide apparatus for measuring the relatve humidity of the gas which overcomes in a relatively simple way the difficulties mentioned, which has a simple constructional form and which indicates the measured result.

The device according to the invention is mainly characterized in that a chamber for receiving at least a part of the gas is provided with means for selectively adjusting the gas molecules contained in unit volume, and in that a moisture measuring head in the form of a hydroscopic electric resistor is arranged inside the chamber, the value of the resistance of which varies in dependence on the relative humidity in the chamber, and which is connected into an electric resistance measuring circuit outside the chamber.

In an advantageous embodiment, which allows continuous moisture measurement, the chamber has an inlet and an outlet of which the first is connected with a gas supply means, and a regulating element is provided, with the help of which the ratio between the quantity of gas entering through the inlet during a given time and the quantity of gas leaving through the outlet in the same time can be adjusted. The gas supply means can be a vacuum pump, of which the suction side is in communication with a space to be evacuated and of which the outlet side is connected to the inlet of the chamber, while the outlet of the chamber is provided with an adjustable pressure regulating valve, which holds the pressure in the chamber constant.

In another advantageous embodiment of the invention, the chamber has at least one movable wall which is preferably movable with respect to an opposed wall so as to vary the volume of the chamber. This last has an inlet and an outlet opening which is provided with a closure means which can be selectively opened and closed. Preferably the movable wall of the chamber is arranged to be supplied with a gaseous pressure medium on its outer side remote from the interior of the chamber and movable by the pressure difference between the chamber interior and the outer side of the movable wall until this pressure difference reaches to zero.

In many actual applications, it is advantageous, to arrange a second hydroscopic electric resistor on the outer side of the chamber, the resistance value of which varies in dependence on the relative humidity of an exterior gaseous medium and which is connected with a second electric resistance measuring circuit. If desired, the two electric resistance measuring circuits can be combined into a bridge circuit which has as its electric output a signal which indicates the difference in the relative humidity of the gases in the chamber and the outer gaseous medium.

Apparatus for embodying the invention can be used with advantage for the direct measurement of the relative moisture content that material in a vacuum dryer would have under atmospheric pressure.

The invention will be better understood from the following description of embodiments thereof, given by way of example only, and from the accompanying drawings, in which the various embodiments are shown schematically.

In the drawings:

FIG. 1 shows a first embodiment of the invention in schematic form, the embodiment comprising a device with a vacuum dryer, a vacuum pump and a measuring chamber the humidity in which is measured;

FIG. 2 shows on a larger scale and in section a moisture measuring probe or head, which can be used advantageously in the measuring chamber of FIG. 1;

FIG. 3 is a cross section on the line III—III of the measuring probe of FIG. 2;

FIG. 4 shows an electric bridge circuit into which parts of the measuring probe are connected;

FIG. 5 shows a second embodiment of the invention, with a measuring chamber of adjustable volume, partly in elevation and partly in section;

FIG. 6 is a schematic sectional representation of a third embodiment of the invention, in which two like moisture measuring heads are provided, one within and one outside a chamber which can be sealed and is of variable volume;

FIG. 7 shows an electric bridge circuit in which parts of the measuring heads of FIG. 6 are connected; and FIG. 8 shows a modification of the chamber of adjustable volume shown in FIG. 6.

The device represented in FIG. 1 comprises a vacuum chamber 11, of which only part is shown, appropriate for the reception of an article or articles to be dried. The drying chamber 11 is provided with a manometer 12 for measuring the pressure in the dryer and with a thermometer 13 for measuring the temperature in the interior of the dryer. An evacuating tube 14 is connected to the dryer 11 and leads to the suction side of a vacuum pump 15. The pump 15 is in driving connection with a motor M. From the exhaust side of the pump 15 a tube 16 leads to an inlet 17 of a measuring chamber 18. The chamber 18 has also an outlet 19 to which is connected an adjustable pressure regulating valve 20 which serves the purpose of holding the pressure in the chamber 18 automatically to the selected value. Associated with the chamber 18 are a manometer 21 and a thermometer 22 for measuring the pressure and temperature respectively of the gases contained in the chamber. In the interior of the chamber a moisture measuring probe 23 is located which is further described below with reference to FIGS. 2 and 3.

The head 23, as appears from FIGS. 2 and 3, has a central support rod 24, provided with an axially extending opening so as to have the form of a tube. The support rod 24 consists of electrically insulating non-hygroscopic material, preferably quartz glass. Two ring-like metal mounts 25 are arranged on the outer surface of the rod 24, each at a distance from its ends. A second shorter rod 26 of the same material, that is, likewise preferably of quartz glass, extends parallel directly against the support rod 24 and is rigidly secured to this, for example, by an adhesive, which is applied at the ends of the second rod 26. The spacing of the two metal mounts 25 from one another is less than the length of the second rod 26. In the grooves between the two rods 24 and 26 is located a small amount of an electrolyte 27, for example, a lithium salt solution. The electrolyte is held by capillary action in the grooves between the rods 24 and 26 and can consequently not flow away. It constitutes a hygroscopic electrically resistive element of which the resistance value is dependent in a known and reproducible way on the relative humidity of the surrounding gases.

On the two end parts of the support rod 24 are located flange-like discs 28 and 29 which carry a cylindrically shaped dust filter 30 at their outer edges, which is spaced from but encloses the rods 24 and 26 as well as the electrolyte 27. The dust filter 30 consists of non-hygroscopic material, for example, a fine metal grid or screen or a thin porous metal sheet.

In the hollow space of the tubular support rod 24 is located an electric reference resistor 31, the electrical resistance of which is not dependent on the surrounding moisture. So that the electrolytic resistor 27 and reference resistor 31 show the same temperature co-efficient, the reference resistor is made as a tube of electrically insulating material, preferably quartz glass, hermetically sealed at both ends and an electrolyte enclosed within the tube, which advantageously has the same composition as the electrolyte 27. In the ends of this tube are fused connection leads 32 and 33 which serve for connection to the electrolyte enclosed within the tube and which project out from the ends of the tubular support rod 24. Two further connection leads 34 and 35 are connected to the metal mounts 25 and allow connections to be made to the electrolytic resistor 27. Advantageously, the one lead 33 of the reference resistor 31 is connected with the lead 34 of the resistor 27, so that the probe 23 has only three leads 32, 34 and 35 extending from it. These are not shown in FIG. 1 for simplicity.

The hygroscopic electrolytic resistor 27 and the non-hygroscopic reference resistor 31 are connected into an electric bridge circuit in accordance with FIG. 4. The bridge circuit is completed in a known way by two equalizing resistors 36 and 37, a source of electric potential 38 and an indicating instrument 39, of which the last can be, for example, an amplifying voltmeter.

The use and operation of the device described with reference to FIGS. 1–4 is for example as follows.

By means of the pump 15, air which contains water vapor is sucked from the vacuum chamber 11, the water vapor coming from the articles G to be dried. The relative humidity of the air remaining in the vacuum dryer 11 corresponds at least approximately to the relative humidity of the articles G. In order to supervise and control the drying process, that is, the amount of moisture in the goods G, it is therefore sufficient to measure the relative humidity of the air sucked from the dryer 11. For this purpose, the air expelled from the outlet side of the pump 15 is lead into the chamber 18 which contains the humidity measuring head 23. The pressure regulating valve 20 is so adjusted that a constant pressure is maintained in the chamber 18 which is suitably higher than the pressure in the vacuum dryer 11. Consequently, the number per unit volume of the gas molecules (air and water vapor) in the chamber 18 is increased in proportion to the greater pressure. So also is the relative humidity of the air in the chamber 18 increased so that the moisture can be measured without difficulty and with the necessary precision by means of the probe 23 and the bridge circuit according to FIG. 4. The measurement can be carried out continuously. Because the relative humidity, the pressure and the temperature of a gas are connected according to natural laws, knowledge of the relative humidity in the chamber 18 allows the actual relative humidity of the air and the moisture content of the articles G in the dryer 11 to be calculated or read from tables, after reference has been made to the indications of the manometers 12 and 21 and to those of the thermometers 13 and 22.

For the case in which the temperature of the air in the dryer 11 and in the measuring chamber 18 are equal, the ratio of the relative humidities and the ratio of the pressures in the dryer 11 and in the chamber 18, are equal. Where:

$\alpha_1$=the relative humidity in dryer 11
$p_1$=the pressure in the dryer 11
$\alpha_2$=the relative humidity in the chamber 18
$p_2$=the pressure in the chamber 18 then provided there are equal temperatures in the dryer 11 and the chamber 18:

$$\alpha_1 = \alpha_2 \cdot \frac{p_1}{p_2}$$

If the ratio of the pressures $p_1$ and $p_2$ is held constant, the indicating instrument 39 can be calibrated to show directly the value of the relative humidity of the air in the vacuum dryer.

The device described can be used in a particularly simple way for continuously measuring the relative humidity which the articles G contained in the vacuum dryer 11 would have at atmospheric pressure, or at any other pressure, to show a measurement of the relative humidity of the material G after withdrawal from the vacuum dryer to the atmosphere. To carry out this measurement, the pressure regulating valve 20 is so adjusted that atmospheric pressure, for example 760 torr is present in the measuring chamber 18. Then the measurement of the relative humidity in the chamber 18 affords the desired result directly, without any calculation being necessary, insofar as the air in dryer 11 and in the chamber 18 has the same temperature, the temperature difference being otherwise taken into account. With the same temperature, $$\alpha_2 = \alpha_1(p_2)$$

in which $\alpha_1(p_2)$ is the relative humidity of the air in the dryer 11 or the material G at pressure $p_2$, that is, at atmospheric pressure.

In this method of use of the device, there is generally no need to know the actual pressure $p_1$ in the vacuum dryer. The measurement is independent of the pressure in the dryer and independent of the temperature, as long as the temperature in the dryer 11 is the same as that in the chamber 18. This independence of temperature of the measurement is also in fact reached in that the hygroscopic resistance 27 necessary for the humidity measurement has the same temperature coefficient as the reference resistor 31.

The second embodiment of the invention shown in FIG. 5 again has a vacuum dryer 11 which is only partly shown. This is connected by a pipe 40 with a measuring chamber 118 which is defined by a cylindrical wall 41, a piston 42 and floor 43. The piston 42 is axially movable in the cylinder 41 and is sealed in a gastight manner against the inner surface of the cylinder. By axial movement of the piston 42, the volume of the chamber 118 can be altered. A piston rod 44 connected to the piston 42 is slidably journalled through an aperture in a lid 45. The piston rod 44 extends also through an axial bore in a compression bushing 46 which has an external thread 47 in engagement with a correspondingly internally threaded bore 48 in the lid 45. The threaded bore 48 also contains a ring-shaped elastically flexible packing element 49, which can be compressed by means of the bushing 46, so that it is forced into engagement with the piston rod 44 and secures this in a selected position. The bushing 46 is however releasable, so as to permit axial movement of the piston rod 44 and the piston 42. The lid 45 is provided with at least one opening 50 which connects the space 51 at the side of the piston 42 remote from the chamber 118 with the atmosphere. In a recess in the floor 43 a humidity measuring probe 23 is arranged which has the same form as the probe described with reference to FIGS. 2 and 3. In a duct 40 a closure cock 52 is fitted which can be selectively opened and closed. A manometer 21 is in communication with the side of the closure cock 52 towards the chamber 118. Finally, the chamber 118 has an air access connection 53 with a closure cock 54 which can be selectively opened and closed. The duct 40 and the air access connection 53 both connect through the floor 43 with the chamber 118.

The mode of use and operation of the device according to FIG. 5 is for example as follows.

At the beginning of a measurement operation the closure cock 52 is closed and the cock 54 of the connection 53 open. The lock bushing 56 is then loosened sufficiently for the piston 42 and piston rod 44 to be movable axially, whereafter the piston 42 is moved against the lid 45 by means of the piston rod 44 and fixed in this position by screwing in the locking bushing 46. The chamber 118 has now its greatest possible volume and contains air at atmospheric pressure. Next the cock 54 of the connection 53 is closed and the cock 52 in the duct 40 to the vacuum dryer 11 is opened. This effects that the chamber 118 has the same lower pressure $p_1$ as in the vacuum dryer 11. Because in practice the volume of the vacuum dryer is always much greater than that of the chamber 118, there is practically no significant pressure increase in the vacuum dryer when the cock 52 is opened. A vacuum pump (not shown) which is additionally connected to the vacuum dryer also tends to keep the pressure in the dryer constant. The value of the pressure $p_1$ in the vacuum dryer 11 and now also in the chamber 118 can be read from the manometer 21. Also, the relative humidity in the chamber 118 corresponds after a short time with the relative humidity in the dryer 11. This humidity has as a rule a value so low that it cannot be measured by the probe 23 and the bridge circuit of FIG. 4.

In order to permit this humidity measurement, the cock 52 in the duct 40 leading to the vacuum dryer is closed and the securement of the piston rod 44 is loosened by releasing the bushing 46 sufficiently for the piston rod 44 and the piston 42 to be movable without difficulty. The difference between the pressure in the chamber 118 and in the space 51 now has the consequence that the piston 42 is automatically lowered until the pressure difference is equal. Thus the volume of the chamber 118 is reduced and the pressure in the chamber raised to atmospheric pressure $p_3$, which value can be read from the manometer 21. By the volume reduction of the chamber 118 the number of gas molecules (air and water vapour) per unit volume in the chamber 118 is correspondingly raised so that the relative humidity is likewise increased and reaches a value $\alpha_3$ which can be and is measured by means of the head 23. Assuming that the temperature in the chamber 118 is unaltered, the relative humidity $\alpha_1$ in the vacuum dryer can be calculated from:

$$\alpha_1 = \alpha_3 \frac{p_1}{p_3}$$

The measurement of the relative humidity in the vacuum dryer 11 cannot be carried out continuously.

If it is not required to ascertain the actual humidity in the vacuum dryer 11, but the moisture content of the material contained in the vacuum dryer, under the assumption that these are under atmospheric pressure, no calculation of the resulting measurement is required because the measured humidity is itself the value required.

The device of FIG. 5 allows also measurement of the particular relative humidity, which the articles contained in the vacuum dryer 11 would have on withdrawal into a known other pressure $p_0$ instead of the atmospheric pressure considered, at the time at which the measurement is made. To this end, the procedure is as follows. On closing the cock 52 in the duct 40 to the dryer 11 and on opening cock 54 in the connection 53, the piston 42 is lowered to its lowest position, in which it is secured by screwing in the locking bushing 46. Next, the cock 54 of the connection 53 is closed and the cock 52 in the connection to the vacuum dryer 11 is opened. Then the chamber 118 has the same pressure $p_1$ and the same relative humidity $\alpha_1$ as exists in the dryer 11. Then the cock 52 in the duct 40 to the vacuum dryer is closed again and the securement of the piston rod 44 is released by partially unscrewing the locking bushing 46. The atmospheric pressure in the space 51 over the piston 52 then moves the piston so far upwardly that the pressure in the chamber 118 is equal to atmospheric pressure. Finally, by means of the piston rod 44, the piston 42 is moved by hand upwards or downwards until the manometer 21 shows the selected pressure $p_0$, for example precisely 760 torr, when the actual atmospheric pressure obtaining is for example 720 torr. In this new position, the piston 42 is secured by means of the bushing 46, after which the relative humidity in the chamber 118 is measured by means of the probe 23. The result of this measurement gives directly the particular relative humidity which the articles in the vacuum dryer would have under the pressure $p_0$ of 760 torr.

The third embodiment of the invention shown schematically in FIG. 6 has an outer space 55 in which a chamber 218 of variable volume is located. The space 55 is connected through a duct 56 with a vacuum dryer 11. A closure cock 57 is provided in the duct 56. Moreover, a connection 58 communicates with the space 55 and is provided with a closure cock 59. The chamber 218 has a fixedly mounted floor 60 and a cover 61 movable with respect thereto, and connected to the floor by a bellows 62 in a gastight manner. On the floor 60 is a tubular connection 63, which is provided with a cock 64. The chamber 218 contains a humidity measuring head 23 secured on the cover 61. A like head 223 is secured on the adjacent outer side of the cover 61 and is thus consequently in connection with the vacuum drying chamber 11. The probe 23 has the structure as described with reference to FIGS. 2 and 3. Its hygroscopic resistor 27 and its reference resistor 31 are included in an electric bridge circuit according to FIG. 7. The second probe 223 which is built in the same way as the probe 23 has an hygroscopic electric resistor 227 and a non-hygroscopic reference resistor 231 which resistors complete the bridge circuit of FIG. 7. Consequently the bridge circuit has as its output value, which shown on an instrument 39, a signal dependent on the difference between the relative humidities in the chamber 218 and the drying space 11.

The use and operation of the device according to FIGS. 6 and 7 is as follows.

To effecting the measurement, the cock 57 in the duct 56 leading to the vacuum dryer 11 is closed and thereafter the cocks 59 and 64 are opened to allow the air to enter into the space 55 through the connection 58 and into the chamber 218 through the duct 63 respectively. Care is thereby taken that the same selected pressure $p_0$ is reached in the space 55 as also in the chamber 218, this pressure being that at which the humidity measurement of the material contained in the vacuum dryer 11 is to be made. The pressure amounts for example to 760 torr. Then additional measures are taken to allow the predetermined relative humidity $\alpha_2$ in the chamber 218. The value $\alpha_2$ is the particular relative humidity which the articles contained in the dryer 11 should have under ideal circumstances, after withdrawal into pressure $p_0$. Moreover, $\alpha_0$ can also designate the desired value of the relative humidity in the dryer 11, referred to the pressure $p_0$. The desired humidity in chamber 218 can be adjusted in different ways, for example, by allowing air or another gas with pressure $p_0$ and humidity $\alpha_0$ to flow in, or by including in the chamber a suitable moisture source which provides a constant relative humidity $\alpha_0$. Next the cocks 59 and 64 are closed.

To carry out the moisture measurement in the vacuum dryer 11, the cock 57 is opened so that after a short space of time the outer chamber 55 has the same pressure $p_1$ and the same relative humidity $\alpha_1$ as the vacuum dryer. The difference in pressure in the space 55 and in the chamber 218 given up effects that the volume of the chamber 218 is enlarged until the pressure difference is zero, by means of the adjustment afforded by the expansion of the bellows 62 having a normal return spring force. The volume enlargement of the chamber 218 causes, as a consequence, a reduction in the pressure in the interior of the chamber 218 to a value $p_{01}$ which corresponds to the pressure $p_1$ in the vacuum dryer 11. This pressure reduction has another consequence in causing a corresponding reduction of the relative humidity in chamber 218 to a value $$\alpha_{01} = \alpha_0 \cdot \frac{p_{01}}{p_0} = \alpha_0 \cdot \frac{p_1}{p_0}$$

as long as the temperature is constant. Because the moisture content $\alpha_{01}$ in the chamber 218 influences the hygroscopic resistor 27 and the humidity in the space 55 influences the second hygroscopic resistor 27, the bridge circuit of FIG. 7 measures the difference $\alpha_1 - \alpha_0$. The measured difference is proportional to the deviation of the relative humidity from the desired value $\alpha_0$, which the material in the dryer 11 draws from pressure $p_0$. The measurement can be carried out continuously and use can be made of the output signal appearing on the instrument 39 of the bridge circuit of FIG. 7 to regulate the vacuum dryer automatically so that the mentioned deviation and consequently the measured difference $\alpha_1 - \alpha_0$ can be brought to zero. This kind of automatic regulation is of great practical use particularly in a conveyor type vacuum dryer with continuous advance of the goods to be dried through the dryer. The regulation produced is independent of the value of the pressure in the dryer and independent of the particular temperature in as far as the dryer, the space 55 and the chamber 218 maintain an equally high temperature.

If the volume variation of the chamber 218 by its bellows 62 involves resilient force in opposition which cannot be overlooked, then the reduced pressure $p_{01}$ in the chamber is not precisely equal to the pressure $p_1$ in the space 55, so that an error in the moisture measurement or in the automatic regulation of the vacuum dryer will occur. Such errors have an essentially constant character and can therefore be corrected relatively easily. The necessary correction can be allowed for in the adjustment of the reference pressure $p_0$ or by means of an adjustable correction resistor in one limb of the bridge circuit of FIG. 7.

By taking into account the correcting factor mentioned and the calculating ratio $p_{01}/p_0$ the reading of the instrument 39 and desirably also the actual deviation of the relative humidity $\alpha_1$ can be mounted in the desired humidity value $\alpha_{01}$ reduced by the pressure $p_{01}$.

In a modification of the device of FIG. 6, which is not illustrated, the outer chamber 55 can be omitted and the chamber 218 with variable volume can be placed directly in the vacuum dryer. The measurement or regulation can then be carried out in the same way as described above. The chamber 218 however must be withdrawn from the dryer for the preparatory adjustment of the pressure $p_0$ and the relative humidity $\alpha_0$ of the gases contained in the chamber, or the adjustment of the pressure and the relative humidity in the chamber 218 must be undertaken in a not yet evacuated state of the dryer, so as in both cases no increase in the volume of the chamber under the influence of the reduced pressure $p_1$ occurs during the adjustment.

FIG. 8 shows a further modification of the chamber 318 of adjustable volume. The chamber 318 is formed of a box shaped lower part 66 and a flexible membrane 67 of which the central part is movable with respect to the floor of the chamber to alter the chamber volume. In the interior of the chamber 318 there is again provided a moisture measuring head 23 while a second like probe 223 is arranged on the outer side of the chamber. The chamber of FIG. 8 can be substituted directly for the chamber 218 in the device according to FIG. 6.

Although in the embodiments of the invention previously described, only the measurement of the relative humidity of air has been envisaged, apparatus in accordance with the invention can obviously be used for the measurement of the moisture contents of other gases.

The embodiments of the invention shown in FIGS. 5 and 6 relate only to the determination of very low relative humidities in vacuum dryers but are equally suited to the measurement of very high relative humidities in compressed gases, for example in a gas conduit. With the embodiment of FIG. 5, the compressed gas is allowed into the chamber 118 while the piston 42 is secured in its lowest position. After closing the cock 52, this securement is released so that the volume of the chamber 118 is automatically enlarged by upward movement of the piston until atmospheric pressure is reached in the chamber. Thus the relative humidity in the chamber is correspondingly reduced and can be readily measured. Finally, the relative humidity in the chamber 118 is measured by means of a head or probe. By multiplication of the measured value with the quotient of the pressure of the compressed gases and atmospheric pressure, there is finally obtained the required relative humidity of the compressed gas.

If the device of FIG. 6 is used with a gas source at high pressure and with high relative humidity instead of with a vacuum dryer, then the gas in the space 55 effects a compression of the chamber 218. This causes as a consequence a corresponding increase of the pressure and the relative humidity in the interior of the chamber 218. By means of the heads 23 and 223 in the bridge circuit of FIG. 7, the difference of the relative humidities in the space 55 and in the chamber 218 can be measured.

In all cases it is possible to determine by known physical laws the absolute moisture content of a particular gas volume from the measured relative humidity, taking into account the pressure and the temperature. The invention even allows the determination in a simple way of the absolute moisture content of supersaturated steam, in that the supersaturated mixture of gas and steam is expanded in the measuring chamber and brought to a suitably lower pressure, so that the temperature is reduced and the relative humidity brought down to a range in which measurement can be conveniently made. From the resulting measurement, the relative humidity can be later used to calculate the required absolute moisture content of the supersaturated mixture.

The presently described measuring processes can be carried out especially simply and continuously with a modification of the device shown in FIG. 1. Instead of the vacuum dryer 11 a kettle or boiler is then provided with the gas supersaturated with steam. The vacuum pump 15 as arranged the outlet side of the pressure regulating valve 20 while between the tube 14 and 16 a throttle valve (not shown) is connected. Finally co-operation with the pump 15 and the pressure regulating valve 20 ensures that the measuring chamber 18 has a constant pressure preferably below atmospheric pressure, in which the relative humidity can be measured by means of the probe 23.

It is desirable to provide the measuring chamber 18 (or 118 or 318) with a conventional heat insulating cover in order to eliminate as far as possible the influence of outside temperatures, whereby a substantially adiabatic environment is provided for permitting proper operation of the apparatus.

What I claim is:

1. A device for measuring the moisture content of a gas, comprising:
 a pair of substantially parallel, adjacent bars of electrical insulating material, at least one of said pair of bars comprising a tube-like member;
 hygroscopic electric resistor means having a resistive value which varies in dependence on the moisture of the gas surrounding same, said hygroscopic electric resistor means including an electrolyte disposed in the space between and held in contact with said pair of bars;
 nonhygroscopic resistance means disposed in the interior of said tube-like member and being nonsensitive to the moisture of the gas, said resistance means having approximately the same resistance value as said hygroscopic resistor means; and
 electrical circuit means connected to the hygroscopic resistor means and the resistance means for determining the moisture content of the gas.

2. A device according to claim 1, in which said resistance means comprises an electrolyte sealed within a glass tube.

3. Apparatus according to claim 1, in which said pair of bars have adjacent rounded portions, and the electrolyte comprising said hygroscopic electric resistor means being held by capillary forces in the groove between the two rounded portions.

4. An apparatus according to claim 3, in which said tube-like member has flange-like disks supported thereon adjacent its opposite ends, and a tubular dust filter being supported on said disks and enclosing and being spaced from said pair of bars.

5. A device according to claim 3, in which the electrical circuit means comprises an electrical bridge circuit with said resistance means comprising one arm of the bridge circuit and said hygroscopic resistor means comprising another arm of the bridge circuit.

6. An apparatus for measuring the relative humidity of a gas, particularly a gas of extremely low humidity, comprising:
 chamber means for receiving a gas therein;
 means for compressing the gas for causing an increase in the number of gas molecules per unit volume when the gas is disposed in the chamber means;
 moisture measuring means disposed within the interior of the chamber means and including a pair of substantially parallel, adjacent bars of electrical insulating material, said bars having a curved external configuration and one of said bars comprising a hollow tube-like member;
 said moisture measuring means further including a hygroscopic electric resistor having a resistive value which varies in dependence on the relative humidity of the gas contained within the chamber, said hygroscopic electric resistor comprising an electrolyte held by capillary forces in a groove between said two bars;
 said moisture measuring means also including a reference resistor disposed within the interior of said hollow member, said reference resistor being independent of the moisture contained in the surrounding gas and having approximately the same resistance value as the hygroscopic resistor; and
 electrical circuit means disposed externally of the chamber means and electrically connected to the hygroscopic electric resistor for indicating the relative humidity of the gas contained within the chamber means.

7. An apparatus according to claim 6, wherein said chamber means defines a chamber of substantially constant volume, and wherein said means for compressing said gas comprises compressor means disposed externally of said chamber and interconnected therewith for supplying said gas thereto.

8. An apparatus according to claim 6, wherein said chamber means includes a stationary wall means and at least one movable wall means for defining a chamber of variable volume, and wherein said means for compressing said gas includes said movable wall means for decreasing the volume of said chamber whereby the gas within said chamber is compressed for increasing the number of gas molecules per unit volume.

References Cited
UNITED STATES PATENTS

| | | | |
|---|---|---|---|
| 2,629,253 | 2/1953 | Deaton | 73—29 |
| 2,643,464 | 6/1953 | Hadady | 236—44X |
| 2,715,836 | 8/1955 | Brady | 73—17 |
| 2,881,617 | 4/1959 | Deis | 73—395 |
| 3,191,428 | 6/1965 | Piros | 73—29X |
| 3,279,089 | 10/1966 | Rudigier, Jr. | 236—44X |
| 2,962,897 | 12/1960 | Muller | 73—336.5 |

RICHARD C. QUEISSER, Primary Examiner

E. J. KOCH, Assistant Examiner

U.S. Cl. X.R.

73—336.5